United States Patent
Gasda et al.

(10) Patent No.: US 12,132,234 B2
(45) Date of Patent: Oct. 29, 2024

(54) FUEL CELL INTERCONNECT OPTIMIZED FOR OPERATION IN HYDROGEN FUEL

(71) Applicant: BLOOM ENERGY CORPORATION, San Jose, CA (US)

(72) Inventors: Michael Gasda, Sunnyvale, CA (US); Cheng-Yu Lin, Cupertino, CA (US); Ling-Hsiang Chen, Sunnyvale, CA (US); Harald Herchen, Los Altos, CA (US); Ian Russell, Sunnyvale, CA (US); Tad Armstrong, Burlingame, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/053,584

(22) Filed: Nov. 8, 2022

(65) Prior Publication Data
US 2023/0155143 A1 May 18, 2023

Related U.S. Application Data

(60) Provisional application No. 63/278,728, filed on Nov. 12, 2021.

(51) Int. Cl.
*H01M 8/0208* (2016.01)
*H01M 8/021* (2016.01)
(Continued)

(52) U.S. Cl.
CPC ....... *H01M 8/0258* (2013.01); *H01M 8/0208* (2013.01); *H01M 8/021* (2013.01);
(Continued)

(58) Field of Classification Search
None
See application file for complete search history.

(56) References Cited

U.S. PATENT DOCUMENTS 8,962,219 B2  2/2015  Couse et al.
8,986,905 B2  3/2015  McElroy et al.
(Continued)

FOREIGN PATENT DOCUMENTS

EP  2348567 A1  9/2010
WO  WO2001/37362 A3  5/2001
(Continued)

OTHER PUBLICATIONS

Roshandel et al., Simulartion of an innovated flow-field design based on a bio inspired pattern for PEM fuel cells, Oct. 24, 2011, Elsevier, Renewable Energy 41, pp. 86-95 (Year: 2011).*

(Continued)

*Primary Examiner* — Ula C Ruddock
*Assistant Examiner* — Mary Grace Byram
(74) *Attorney, Agent, or Firm* — THE MARBURY LAW GROUP PLLC

(57) ABSTRACT

A fuel cell interconnect includes fuel ribs disposed on a first side of the interconnect and a least partially defining fuel channels, and air ribs disposed on an opposing second side of the interconnect and at least partially defining air channels. The fuel channels include central fuel channels disposed in a central fuel field and peripheral fuel channels disposed in peripheral fuel fields disposed on opposing sides of the central fuel field. The air channels include central air channels disposed in a central air field and peripheral air channels disposed in peripheral air fields disposed on opposing sides of the central air field. At least one of the central fuel channels or the central air channels has at least one of a different cross-sectional area or length than at least one of the respective peripheral fuel channels or the respective peripheral air channels.

21 Claims, 7 Drawing Sheets

(51) Int. Cl.
  *H01M 8/0258* (2016.01)
  *H01M 8/026* (2016.01)
  *H01M 8/0265* (2016.01)
  *H01M 8/0276* (2016.01)
  *H01M 8/12* (2016.01)
  *H01M 8/1231* (2016.01)
  *H01M 8/241* (2016.01)
  *H01M 8/2425* (2016.01)
  *H01M 8/2457* (2016.01)
  *H01M 8/2465* (2016.01)
  *H01M 8/2483* (2016.01)

(52) U.S. Cl.
  CPC ......... *H01M 8/026* (2013.01); *H01M 8/0265* (2013.01); *H01M 8/0276* (2013.01); *H01M 8/12* (2013.01); *H01M 8/1231* (2016.02); *H01M 8/241* (2013.01); *H01M 8/2425* (2013.01); *H01M 8/2457* (2016.02); *H01M 8/2465* (2013.01); *H01M 8/2483* (2016.02); *H01M 2008/1293* (2013.01)

(56) References Cited

U.S. PATENT DOCUMENTS

| | | |
|---|---|---|
| 9,196,909 B2 | 11/2015 | Darga et al. |
| 9,368,809 B2 | 6/2016 | Prasad et al. |
| 9,368,810 B2 | 6/2016 | Darga et al. |
| 9,468,736 B2 | 10/2016 | Darga et al. |
| 9,478,812 B1 | 10/2016 | Darga et al. |
| 9,673,457 B2 | 6/2017 | Srivatsan et al. |
| 9,923,211 B2 | 3/2018 | Batawi et al. |
| 10,553,879 B2 | 2/2020 | El Batawi et al. |
| 11,217,797 B2 | 1/2022 | Darga et al. |
| 11,355,762 B2 | 6/2022 | Gasda et al. |
| 2003/0129475 A1* | 7/2003 | Enjoji ............... H01M 8/0267 429/434 |
| 2006/0093891 A1* | 5/2006 | Issacci ............... H01M 8/2483 429/495 |
| 2006/0105223 A1* | 5/2006 | Choi ................. H01M 8/2455 429/457 |
| 2007/0105001 A1* | 5/2007 | Ohma ................ H01M 8/026 429/480 |
| 2008/0193825 A1* | 8/2008 | Nguyen .............. H01M 8/023 429/458 |
| 2008/0199738 A1 | 8/2008 | Perry et al. |
| 2011/0123898 A1* | 5/2011 | Oda .................. H01M 8/0265 429/482 |
| 2013/0129557 A1 | 5/2013 | Herchen et al. |
| 2013/0130152 A1 | 5/2013 | Couse et al. |
| 2013/0130154 A1 | 5/2013 | Darga et al. |
| 2014/0065508 A1* | 3/2014 | Darga ............... H01M 8/0276 429/457 |
| 2015/0147679 A1 | 5/2015 | Darga et al. |
| 2015/0221957 A1 | 8/2015 | Herchen et al. |
| 2015/0311538 A1 | 10/2015 | Batawi et al. |
| 2016/0293974 A1* | 10/2016 | Kurihara ........... H01M 8/2483 |
| 2018/0166703 A1* | 6/2018 | El Batawi ........... C23C 24/04 |
| 2018/0248202 A1 | 8/2018 | Khurana et al. |
| 2019/0372132 A1 | 12/2019 | Gasda et al. |
| 2020/0099066 A1* | 3/2020 | Ghezel-Ayagh .... H01M 8/0258 |

FOREIGN PATENT DOCUMENTS

| | | |
|---|---|---|
| WO | WO2008/094550 A1 | 8/2008 |
| WO | WO2014/036058 A1 | 3/2014 |

OTHER PUBLICATIONS

European Office Communication, extended search report from the European Patent Office (EPO) for European Application No. 22205971, mailed May 3, 2023, 9 pages.

CNIPA Office Action, China National Intellectual Property Administration ("CNIPA") First Office Action without a search report for PRC (China) Patent Application No. 202222970415.4, mailed Mar. 1, 2023 1 page.

China National Intellectual Property Administration ("CNIPA") Office Communication, First Rectification Notification from the CNIPA for PRC (China) Patent Application No. 202222970415.4, mailed May 18, 2023.

\* cited by examiner

FUEL CELL INTERCONNECT OPTIMIZED FOR OPERATION IN HYDROGEN FUEL

FIELD

The present invention is directed to fuel cell stack components, specifically to interconnects and methods of making interconnects for fuel cell stacks.

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnects are commonly composed of a Cr based alloy, such as an alloy known as CrFe which has a composition of 95 wt. % Cr-5 wt. % Fe, or Cr—Fe—Y having a 94 wt. % Cr-5 wt. % Fe-1 wt. % Y composition. The CrFe and CrFeY alloys retain their strength and are dimensionally stable at typical solid oxide fuel cell (SOFC) operating conditions, e.g., 700-900 C in both air and wet fuel atmospheres.

SUMMARY

According to various embodiments, a fuel cell interconnect includes fuel ribs disposed on a first side of the interconnect and a least partially defining fuel channels, and air ribs disposed on an opposing second side of the interconnect and at least partially defining air channels. The fuel channels include central fuel channels disposed in a central fuel field and peripheral fuel channels disposed in peripheral fuel fields disposed on opposing sides of the central fuel field. The air channels include central air channels disposed in a central air field and peripheral air channels disposed in peripheral air fields disposed on opposing sides of the central air field. At least one of the central fuel channels or the central air channels has at least one of a different cross-sectional area or length than at least one of the respective peripheral fuel channels or the respective peripheral air channels to increase hydrogen fuel flow through the central fuel channels or to increase air flow through the peripheral air channels.

According to various embodiments, a method of operating a fuel cell stack containing the above described interconnect includes providing hydrogen fuel into the fuel channels, wherein more of the hydrogen fuel flows through the central fuel channels than through the peripheral fuel channels; and providing air into the air channels, wherein more of the air fuel flows through the central air channels than through the peripheral air channels.

DETAILED DESCRIPTION

Figure 1A:
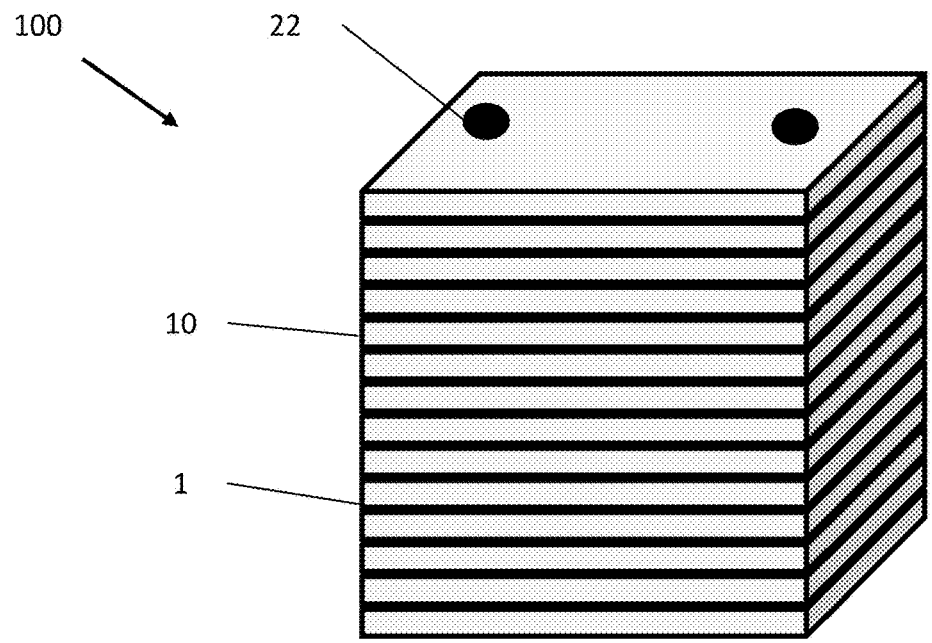
FIG. 1A is a perspective view of a SOFC stack, according to various embodiments of the present disclosure.
Figure 1B:
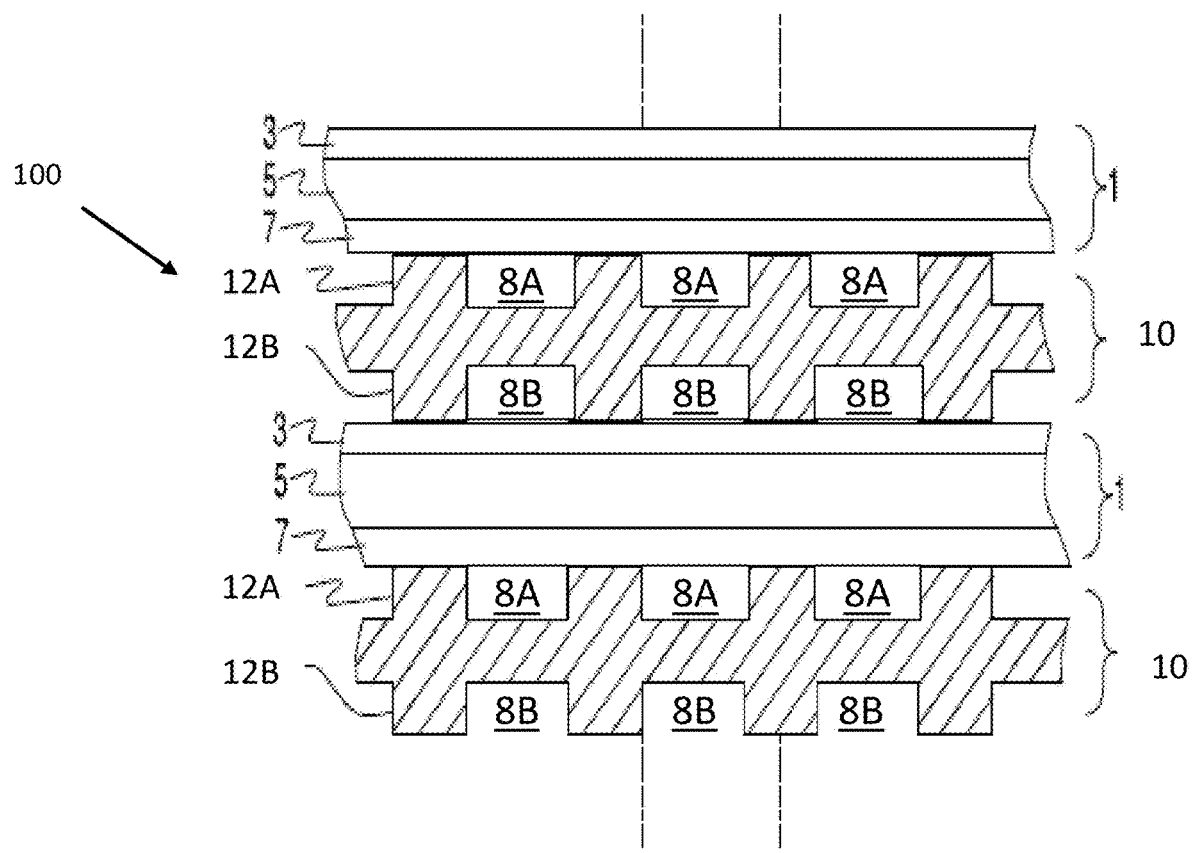
FIG. 1B is a cross-sectional view of a portion of the stack of FIG. 1A.

FIG. 1A is a perspective view of a solid oxide fuel cell (SOFC) stack 100, and FIG. 1B is a sectional view of a portion of the stack 100, according to various embodiments of the present disclosure. Referring to FIGS. 1A and 1B, the stack 100 includes fuel cells 1 separated by interconnects 10. Referring to FIG. 1B, each fuel cell 1 comprises a cathode electrode 3, a solid oxide electrolyte 5, and an anode electrode 7.

Various materials may be used for the cathode electrode 3, electrolyte 5, and anode electrode 7. For example, the anode electrode 7 may comprise a cermet comprising a nickel containing phase and a ceramic phase. The nickel containing phase may consist entirely of nickel in a reduced state. This phase may form nickel oxide when it is in an oxidized state. Thus, the anode electrode 7 is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode 3 may comprise an electrically conductive material, such as an electrically conductive perovskite material, such as lanthanum strontium manganite (LSM). Other conductive perovskites, such as LSCo, etc., or metals, such as Pt, may also be used. The cathode electrode 3 may also contain a ceramic phase similar to the anode electrode 7. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1A is vertically oriented, fuel cell stacks may be oriented horizontally or in any other direction. Fuel and air may be provided to the electrochemically active surface, which can be large. For example, fuel may be provided through fuel conduits 22 (e.g., fuel riser openings) formed in each interconnect 10.

Each interconnect 10 electrically connects adjacent fuel cells 1 in the stack 100. In particular, an interconnect 10 may electrically connect the anode electrode 7 of one fuel cell 1 to the cathode electrode 3 of an adjacent fuel cell 1. FIG. 1B shows that the lower fuel cell 1 is located between two interconnects 10. An optional Ni mesh may be used to electrically connect the interconnect 10 to the anode electrode 7 of an adjacent fuel cell 1.

Each interconnect 10 includes fuel ribs 12A that at least partially define fuel channels 8A and air ribs 12B that at least partially define oxidant (e.g., air) channels 8B. The interconnect 10 may operate as a gas-fuel separator that separates a fuel, such as a hydrocarbon fuel, flowing to the fuel electrode (i.e., anode 7) of one cell in the stack from oxidant, such as air, flowing to the air electrode (i.e., cathode 3) of an adjacent cell in the stack. At either end of the stack 100, there may be an air end plate or fuel end plate (not shown) for providing air or fuel, respectively, to the end electrode.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron, optionally 1 or less weight percent yttrium and balance chromium alloy) and may electrically connect the anode or fuel-side of one fuel cell 1 to the cathode or air side of an adjacent fuel cell 1. An electrically conductive contact layer, such as a nickel contact layer, may be provided between anode electrodes 7 and each interconnect 10. Another optional electrically conductive contact layer, such as a lanthanum strontium manganite and/or a manganese cobalt oxide spinel layer, may be provided between the cathode electrodes 3 and each interconnect 10.

Figure 2A:
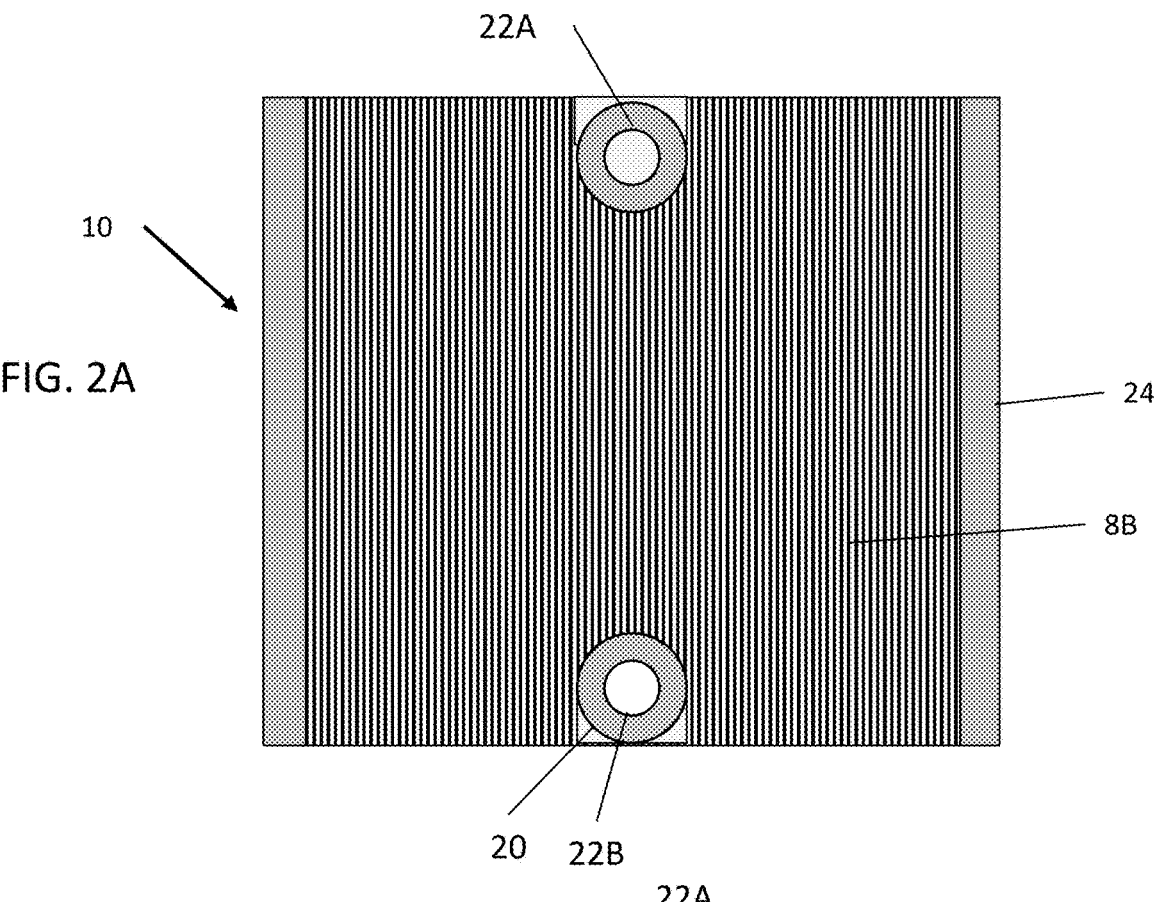
FIG. 2A is a top view of an air side of an interconnect, according to various embodiments of the present disclosure.
Figure 2B:
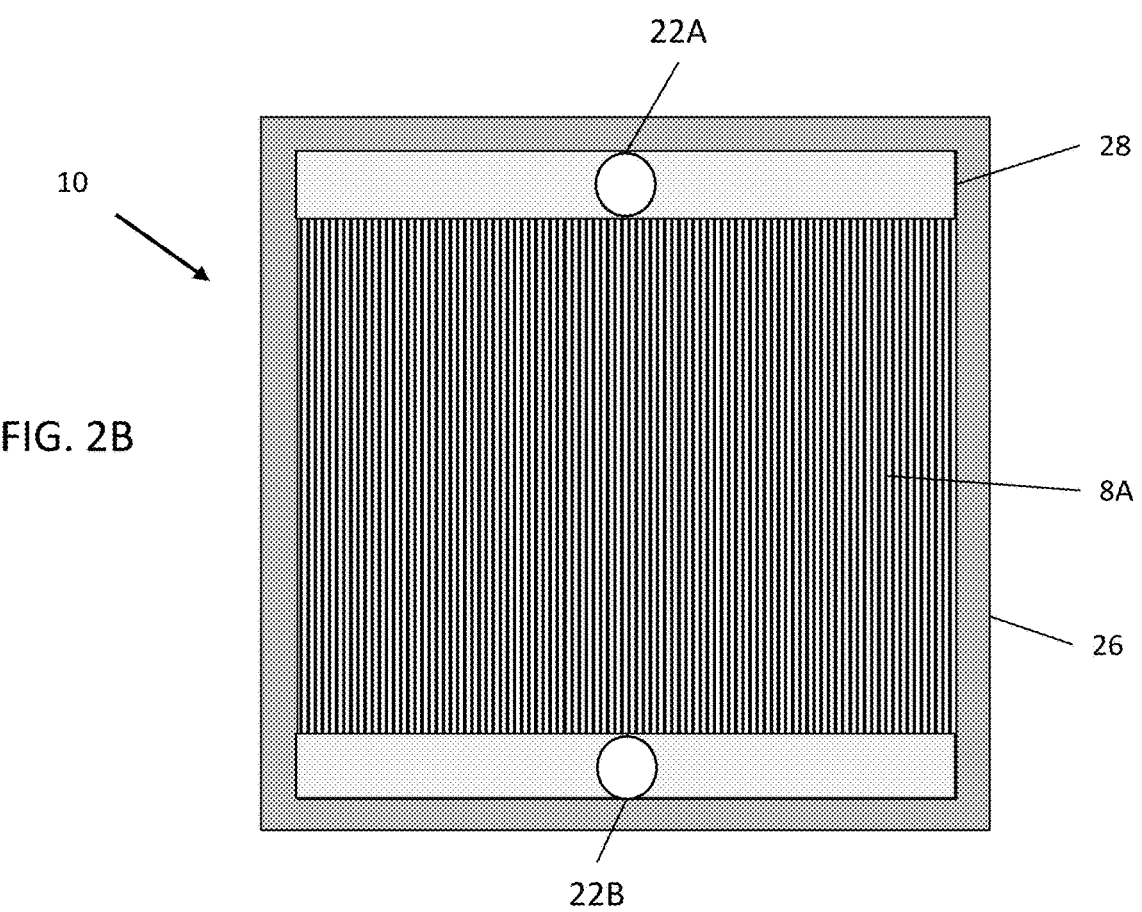
FIG. 2B is a top view of a fuel side of the interconnect of FIG. 2A.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B. Air flows through the air channels 8B to a cathode electrode 3 of an adjacent fuel cell 1. Ring seals 20 may surround fuel holes 22A of the interconnect 10, to prevent fuel from contacting the cathode electrode. Peripheral strip-shaped seals 24 are located on peripheral portions of the air side of the interconnect 10. The seals 20, 24 may be formed of a glass or glass-ceramic material. The peripheral portions may be an elevated plateau which does not include ribs or channels. The surface of the peripheral regions may be coplanar with tops of the ribs 12B.

Referring to FIGS. 1B and 2B, the fuel side of the interconnect 10 may include the fuel channels 8A and fuel manifolds 28. Fuel flows from one of the fuel holes 22A (e.g., inlet hole that forms part of the fuel inlet riser), into the adjacent manifold 28, through the fuel channels 8A, and to an anode 7 of an adjacent fuel cell 1. Excess fuel may flow into the other fuel manifold 28 and then into the outlet fuel hole 22B. A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

As shown in FIGS. 2A and 2B, one of the fuel holes 22A, 22B delivers fuel to each cell in the stack and a corresponding manifold 28 distributes fuel to each fuel channel 8A. Fuel flows straight down each fuel channel 8A, and unreacted fuel is collected in the other manifold 28 and exits the stack via the other fuel hole 28A, 28B. This flow channel geometry is optimized for operation on natural gas with partial external pre-reforming.

The present inventors found that while the interconnect 10 shown in FIGS. 2A and 2B provides a high fuel utilization when a hydrocarbon fuel (e.g., natural gas) is used, the interconnect 10 may not provide a sufficiently high fuel utilization when hydrogen is used as a fuel. Without wishing to be bound by a particular theory, it is believed that using hydrogen as a fuel produces an increased thermal gradient. For example, in a natural gas-fueled system, an endothermic steam reformation reaction occurs at the anode and partially cools the fuel cell. However, with a pure hydrogen fuel, no reformation cooling occurs, and most of the heat generated by the fuel cell is removed by reactant flow (e.g., primarily air flow). This results in higher thermal gradient within the cell 1 (e.g., in the area which corresponds to the center of the interconnects 10 near the fuel inlet hole 22A), and therefore poorer fuel distribution, as fuel flows preferentially to the cooler areas adjacent the edges (i.e., periphery) of the interconnects 10, where the specific volume and viscosity of the gas are lower.

The embodiments of the present disclosure provide interconnects configurations that distribute hydrogen and/or air in a manner that increases fuel utilization and/or reduces thermal gradients.

Figure 3A:
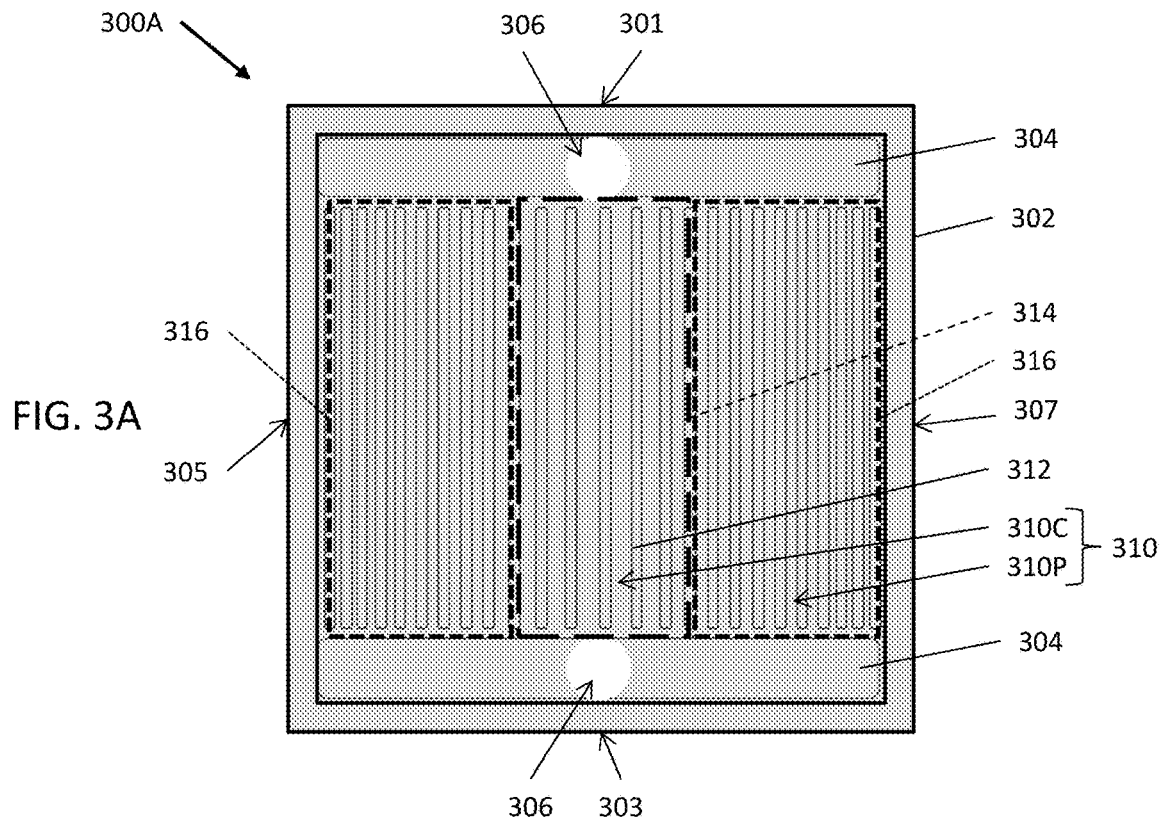
FIGS. 3A-3D are top views of the fuel sides of interconnects, according to various embodiments of the present disclosure.

FIG. 3A is a top view of the fuel side of an interconnect 300A, according to various embodiments of the present disclosure. The interconnect 300A may be similar to the interconnect 10. As such, only the differences therebetween will be discussed in detail.

Referring to FIG. 3A, the fuel-side of the interconnect 300A may include a frame seal region 302, opposing fuel manifolds 304, fuel holes 306, fuel ribs 312, and fuel channels 310. The frame seal region 302 may be a planar surface that extends alone the perimeter of the interconnect 300A. The frame seal region 302 may be coplanar with the tops of the fuel ribs 312. The fuel manifolds 304 may be disposed inside of the frame seal region 302, at opposing edges of the interconnect 300. The fuel holes 306 may be formed in the center of each of the fuel manifolds 304, adjacent to opposing first and second edges 301, 303 of the interconnect 300A.

The fuel ribs 312 and fuel channels 310 may extend between the fuel manifolds 304, in a direction parallel to opposing third and fourth edges 305, 307 of the interconnect 300A. The fuel channels 310 and fuel ribs 312 may be configured to guide fuel flow across the interconnect 300 between the fuel manifolds 304. The interconnect 300A may be divided into a central fuel field 314 and peripheral fuel fields 316 disposed on opposing sides of the central fuel field 314, adjacent to the third and fourth edges 305, 307. The fuel channels 310 may include central fuel channels 310C disposed in the central fuel field 314 and peripheral fuel channels 310P disposed in the peripheral fuel fields 316. In various embodiments, from about 25% to about 50%, such as from about 30% to about 40% of the fuel channels 310 may be the central fuel channels 310C, and a remainder of the fuel channels 310 may be the peripheral fuel channels 310P.

The interconnect 300A may be configured to provide higher fuel (e.g., hydrogen) mass flows through the central fuel channels 310C than through the peripheral fuel channels 310P. In particular, the central fuel channels 310C may have a larger cross-sectional area, taken in a direction perpendicular to the third and fourth edges 305, 307, than a cross-sectional area of the peripheral fuel channels 310P. For example, the central fuel channels 310C may be wider and/or deeper than the peripheral fuel channels 310P. In some embodiments, the cross-sectional areas of the central fuel channels 310C may be from 5% to 40%, such as from 8% to 30%, or from 10% to 20% larger than the cross-sectional areas of the peripheral fuel channels 310P. Accordingly, more fuel mass flow may be provided to a central portion of an adjacent fuel cell via the central fuel channels 310C than is provided to peripheral portions of the fuel cell via the peripheral fuel channels 310P. As such, the interconnect 300A may be configured to direct more hydrogen fuel to areas having higher operating temperatures and corresponding higher fuel flow resistance, due to using hydrogen as a fuel.

In various embodiments, the cross-sectional areas of the fuel channels 310 may vary incrementally, such that the fuel channels 310 closest to the third and fourth edges 305, 307 of the interconnect 300A have the smallest cross-sectional area and the fuel channels 310 that extend through the middle of the interconnect 300A (e.g., that extend between the fuel holes 306) have the largest cross-sectional area.

In some embodiments, the depths of the fuel manifolds 304 may be varied in a lengthwise direction, such that the fuel manifolds 304 have a maximum depth adjacent to the fuel holes 306 and a minimum depth adjacent the third and fourth edges 305, 307 of the interconnect 300A. The variation in depth may result in lower fuel mass flow through the peripheral fuel channels 310P and a higher mass flow through the central fuel channels 310C. The variable depth fuel manifolds 304 may be used with the relatively large central fuel channels 310C and the relatively small peripheral fuel channels 310P or may be used with fuel channels that are all the same size.

Figure 3B:
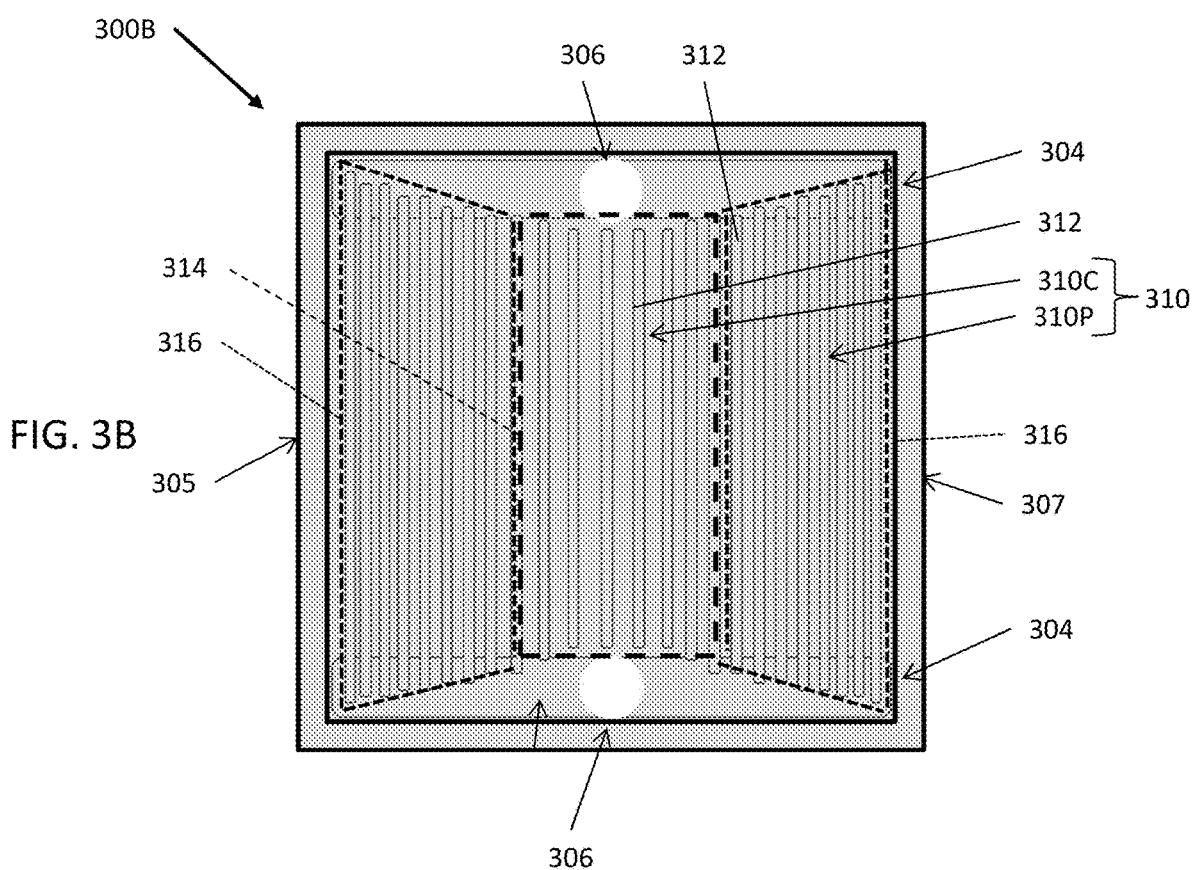

FIG. 3B is a top view of a fuel side of an interconnect 300B, according to various embodiments of the present disclosure. The interconnect 300B may be similar to the interconnect 300A. As such, only the differences therebetween will be described in detail.

Referring to FIG. 3B, at least some of the peripheral fuel channels 310P may be longer than the central fuel channels 310C. In other words, the lengths of the fuel ribs 312 and the fuel channels 310 may increase continuously or step-wise as a distance between the fuel ribs 312 and the fuel channels 310 and the third and fourth edges 305, 307 decreases. In some embodiments, at least some of the peripheral fuel channels 310P and the corresponding fuel ribs 312 may extend into the fuel manifolds 304.

Increasing the lengths of the peripheral fuel channels 310P may increase the fuel flow resistance therethrough. As such, the relatively short central fuel channels 310C may have a higher fuel mass flow (e.g., a lower flow resistance) than the relatively long peripheral fuel channels 310P.

In one embodiment of the interconnect 300B, the shorter central fuel channels 310C may have a larger cross-sectional area (i.e., a larger width and/or depth) than the longer peripheral fuel channels 310P. In another embodiment of the interconnect 300B, the shorter central fuel channels 310C may have the same cross-sectional area (i.e., the same width and depth) as the longer peripheral fuel channels 310P.

The variation in the lengths of the fuel channels 310 may advantageously increase the active area of an adjacent fuel cell, which may provide improved electrochemical performance. In one embodiment, a nickel mesh current collector (not shown) may be used to improve contact between the fuel ribs 312 and the anode of the adjacent fuel cell. To realize the benefit of the higher active area, the Ni mesh may be shaped to correspond to the shape of the longer fuel ribs 312. In other words, the Ni mesh may be configured to completely overlap with the central fuel field 314 and the peripheral fuel fields 316.

Figure 3C:
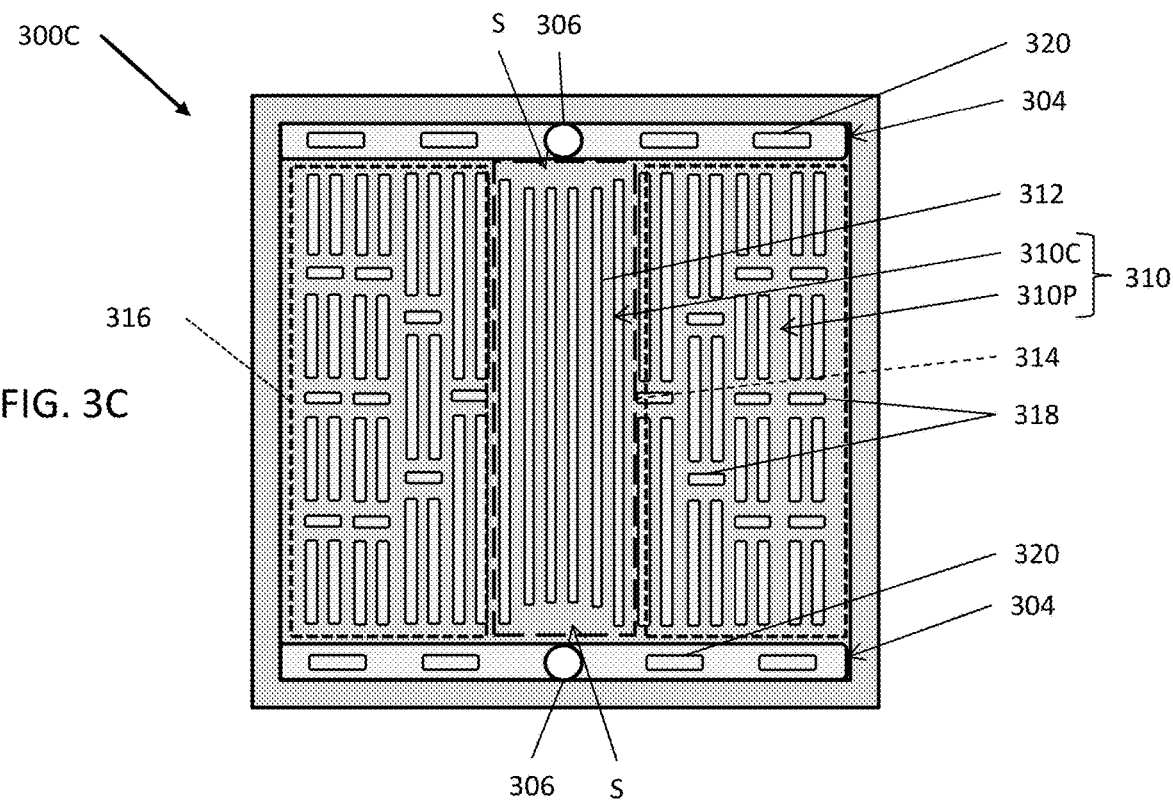

FIG. 3C is a top view of a fuel side of an interconnect 300C, according to various embodiments of the present disclosure. The interconnect 300C may be similar to the interconnect 300A. As such, only the differences therebetween will be described in detail.

Referring to FIG. 3C, the interconnect 300C may include fuel blockers or bumpers 318 that extend across one or more of the peripheral fuel channels 310P. The fuel blockers 318 may extend lengthwise in a direction perpendicular to the fuel channels 310. The fuel blockers 318 may be and configured to reduce fuel mass flow through the peripheral fuel channels 310P, such that fuel mass flow through the central fuel channels 310C is higher than the fuel mass flow through the peripheral fuel channels 310P. In some embodiments, the fuel blockers 318 may be configured to generate a fuel mass flow gradient, such that the peripheral fuel channels 310P further from the central fuel field 314 have a lower mass flow that the peripheral fuel channels 310P closer to the central fuel field 314, thereby increasing the fuel utilization in central portions of an adjacent fuel cell.

In some embodiments, in addition to or instead of the fuel blockers 318, manifold diverters 320 may be disposed in the fuel manifolds 304 to redirect fuel through the fuel manifolds 304 and into the fuel channels 310. For example, the diverters 320 may be configured to direct a higher fuel mass flow into the central fuel channels 310C than into the peripheral fuel channels 310P. The diverters 320 may comprise ribs located in the fuel manifolds 304, and which extend perpendicular to the fuel channels 310 and ribs 312. This configuration may provide the additional benefit of increasing the active area of an adjacent fuel cell.

In various embodiments, spaces S may be formed between the fuel holes 306 and adjacent fuel ribs 312 in the central fuel field 314, in a fuel flow direction. The spaces S may be configured to increase fuel mass flow through the central fuel channels 310C adjacent to the fuel holes 306.

In some embodiments of interconnect 300C, the cross-sectional areas of the central fuel channels 310C may be larger than the cross-sectional areas of the peripheral fuel channels 310P, in order to further increase fuel mass flow through the central fuel channels 310C. However, in other embodiments, the fuel channels 310 may all have substantially the same cross-sectional area.

Figure 3D:
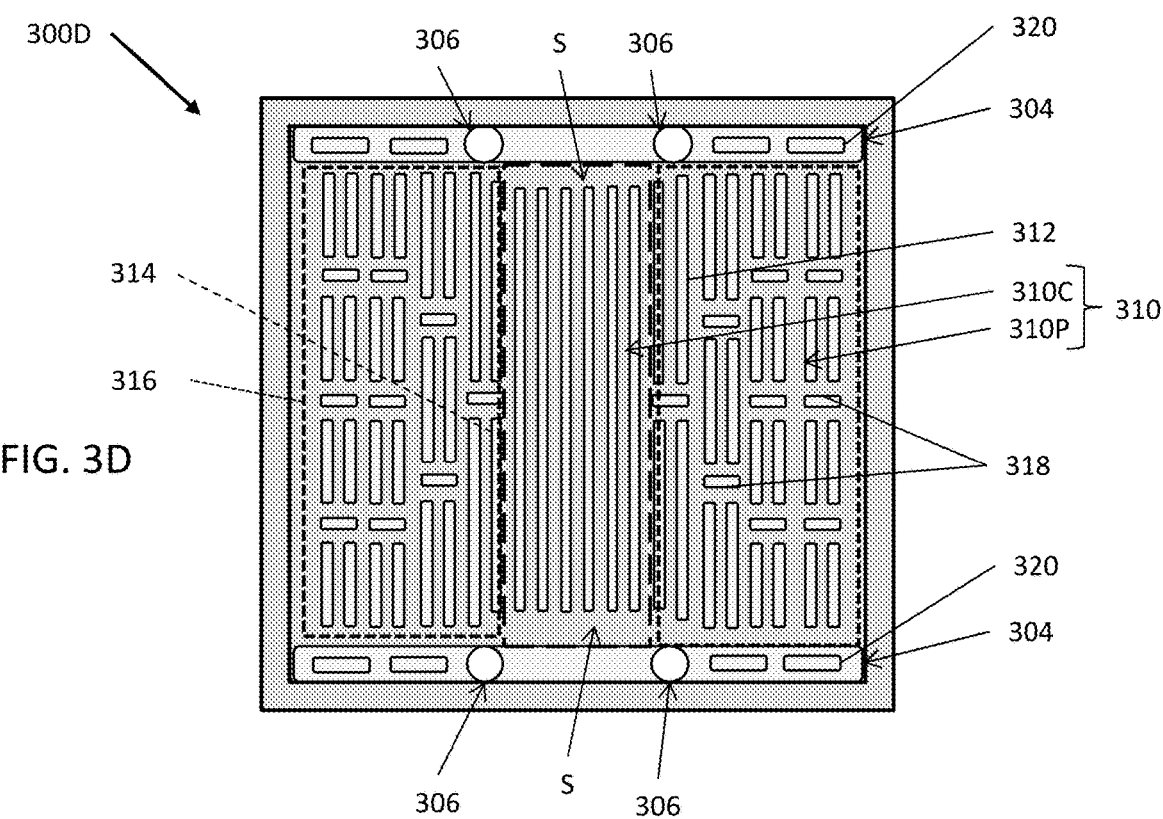

FIG. 3D is a top view of a fuel side of an interconnect 300D, according to various embodiments of the present disclosure. The interconnect 300D may be similar to the interconnect 300C. As such, only the differences therebetween will be described in detail.

Referring to FIG. 3D, the interconnect 300D may include multiple fuel holes 306 in each fuel manifold 304. The multiple fuel holes 306 may improve fuel distribution and/or increase fuel mass flow through the central fuel channels 310C and to a central portion of an adjacent fuel cell.

In various embodiments, spaces S may be formed between the fuel holes 306 and adjacent fuel ribs 312 in the central fuel field 314, in a fuel flow direction. The spaces S may be configured to increase fuel mass flow within the central fuel channels 310C, between the fuel holes 306 on opposing sides of the interconnect 300D.

In some embodiments of interconnect 300D, the cross-sectional areas of the central fuel channels 310C may be larger than the cross-sectional areas of the peripheral fuel channels 310P, in order to further increase fuel mass flow through the central fuel channels 310C. However, in other embodiments, the fuel channels 310 may all have substantially the same cross-sectional area.

Figure 4A:
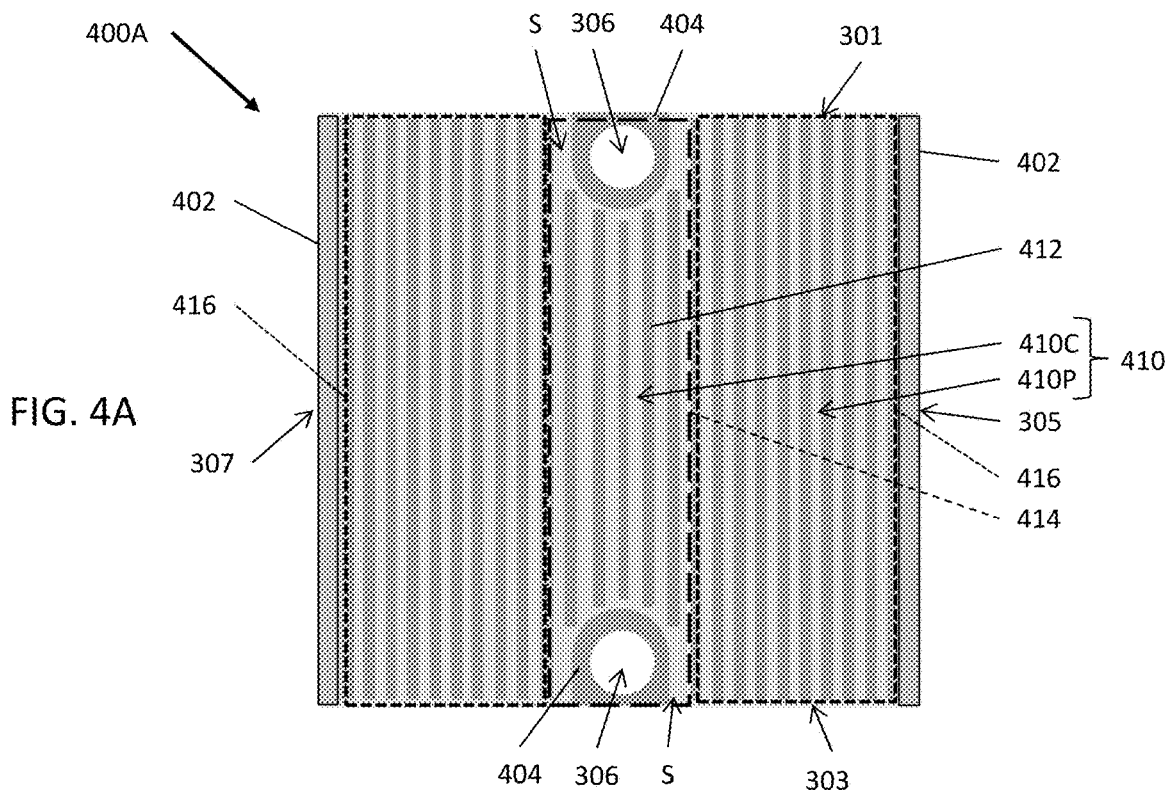
FIGS. 4A-4D are top views of the air sides of interconnects, according to various embodiments of the present disclosure

FIG. 4A is a top view of the air side of an interconnect 400A, according to various embodiments of the present disclosure. Referring to FIG. 4A, the airside of the interconnect 400A may include strip seal regions 402, ring seal regions 404, air (e.g., oxidant) channels 410, air ribs 412, and fuel holes 306. The ring seal regions 404 may be planar regions that surround the fuel holes 306. The strip seal regions 402 may be planar regions disposed on opposing edges of the interconnect 400A. The ring seal regions 404 and the strip seal regions 402 may be coplanar with the tops of the air ribs 412.

The air ribs 412 may at least partially define the air channels 410. The air channels 410 may be configured to guide air across the interconnect between the strip seal regions 402. The air side of the interconnect 400A may be divided into a central air field 414 and peripheral air fields 416 that are disposed on opposing sides of the central air field 414, adjacent to third and fourth edges 305, 307 of the interconnect 400A. The air channels 410 may include central air channels 410C disposed in the central air field 414 and peripheral air channels 410P disposed in the peripheral air fields 416.

In one embodiment, all air channels 410 may have a larger cross-sectional area than the air channels 8B of the comparative interconnect 10 shown in FIG. 2A. This increases the air cooling of the air side of the interconnect 400A when hydrogen is used as a fuel in the fuel side of the interconnect 400A.

In another embodiment, the cross-sectional areas of the central air channels 410C may be larger than the cross-sectional areas of the peripheral air channels 410P of interconnect 400A. For example, the central air channels 410C may be wider and/or deeper than the peripheral air channels 410P. In some embodiments, the cross-sectional areas of the central air channels 410C may be from 5% to 40%, such as from 8% to 30%, or from 10% to 20% larger than the cross-sectional areas of the peripheral air channels 410P. As such, air mass flows through the central air channels 410C may be correspondingly larger than air mass flows through the peripheral air channels 410P. More air mass flow in the central air channels 410C increases cooling of the center of an adjacent fuel cell and reduces thermal gradients in the fuel cell and the interconnect 400A when hydrogen is used as a fuel.

In some embodiments, the cross-sectional areas of the air channels 410 may increase continuously or step-wise as distance to the adjacent third and fourth edges 305, 307 decreases. In some embodiments, the cross-sectional areas of the central air channels 410C may vary incrementally, such that the central air channels 410C closer to the middle of the central air field 414 may have larger cross-sectional areas than central air channels 410C disposed closer to the peripheral air fields 416. However, in various embodiments, at least some of the central air channels 410C may have larger cross-sectional areas than the peripheral air channels 410P.

In some embodiments, the air ribs 412 located in the central air field 414 adjacent to the ring seal regions 404 may be relatively short (i.e., shorter than the air ribs 412 located in the peripheral air field 416), to provide air spaces S to increase air flow around the ring seal regions 404, thereby increase air mass flows through the central air channels 410C extending between the ring seal regions 404 on the opposite side of the interconnect 400A. In other words, at least some of the air ribs 412 in the central air field 414 may be shorter than the remaining air ribs 412, in order to increase air flow through the central air channels 410C in the central air field 414, thereby increasing cooling of corresponding portions of the interconnect 400A and an adjacent fuel cell. In some embodiments in which the air ribs 412 have a different length in the central and peripheral air fields, the cross-sectional areas of the central air channels 410C may be larger than the cross-sectional areas of the peripheral air channels 410P, in order to further increase air mass flow through the central air channels 410C of the central air field 414. In other embodiments, the cross-sectional areas of the central air channels 410C may the same as the cross-sectional areas of the peripheral air channels 410P.

Figure 4B:
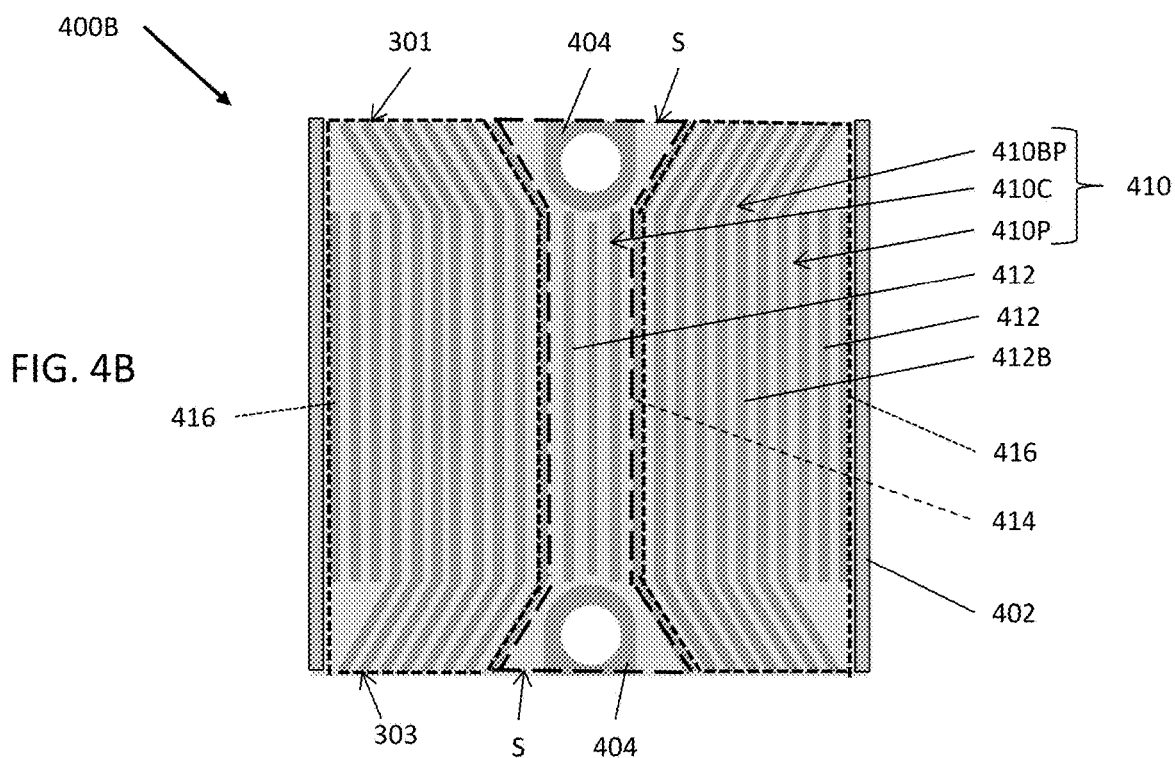

FIG. 4B is a top view of the air side of an interconnect 400B, according to various embodiments of the present disclosure. The interconnect 400B may be similar to the interconnect 400A. As such, only the differences therebetween will be discussed in detail.

Referring to FIG. 4B, the air side of the interconnect 400B may include curved or bent peripheral air channels 410BP and corresponding curved or bent air ribs 412B. In particular, end portions of the bent air ribs 412B may be shaped so as to form air spaces S adjacent to the ring seal regions 404. In other words, edge portions of the bent peripheral air channels 410BP located near the edges 301 and 303 of the interconnect 400B are not parallel to the edges 305 and 307 of the interconnect and are not parallel to the central air channels 410C. For example, edge portions of the bent peripheral air channels 410BP located near the edges 301 and 303 of the interconnect 400B extend at an angle of 30 to 60 degrees relative to the edges 305 and 307 of the interconnect and to the central air channels 410C. In contrast, middle portions of the bent peripheral air channels 410BP at the middle of the interconnect 400B are parallel to the edges 305 and 307 of the interconnect and the central air channels 410C.

The air spaces S may be configured to increase air mass flow into the central channels 410C of the central air field 414. In particular, the spaces S may operate to compensate for an air blockage resulting from the ring seal regions 404. The bent air ribs 412B may also be configured to reduce air mass flow through peripheral air channels 410P adjacent to the strip seal regions 402. For example, the end portions of the bent air ribs 412B may partially block air flow to the outermost peripheral air channels 410P.

In some embodiments, the cross-sectional areas of the central air channels 410C may be larger than the cross-sectional areas of the peripheral air channels 410P, in order to further increase air mass flow through the central air channels 410C of the central air field 414 of interconnect 400B. In other embodiments, the cross-sectional areas of the central air channels 410C may the same as the cross-sectional areas of the peripheral air channels 410P of interconnect 400B.

Figure 4C:
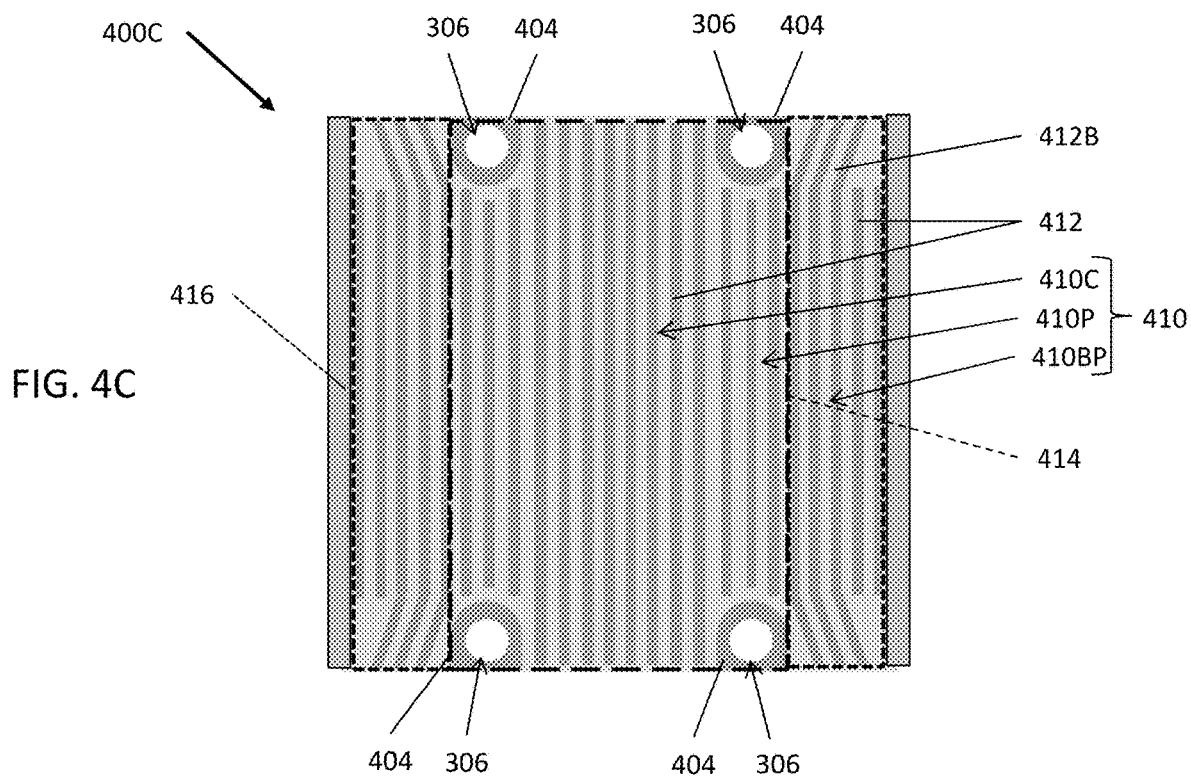

FIG. 4C is a top view of the air side of an interconnect 400C, according to various embodiments of the present disclosure. The interconnect 400C may be similar to the interconnect 400B. As such, only the differences therebetween will be discussed in detail.

Referring to FIG. 4C, the airside of the interconnect 400C may include multiple fuel holes 306 and ring seal regions 404 disposed on opposing top and bottom sides of the interconnect 400C. The ring seal regions 404 may be disposed outside of the central air field 414, such that the central air channels 410C of the central air field 414 are not obstructed by fuel seals. As such, air mass flow through the central air field 414 may be increased since it is not obstructed by fuel seals.

In some embodiments, the cross-sectional areas of the central air channels 410C may be larger than the cross-sectional areas of the peripheral flow channels 410P, in order to further increase air flow through the central air channels 410C. However, in other embodiments, all the air channels 410 may have substantially the same cross-sectional area.

Figure 4D:
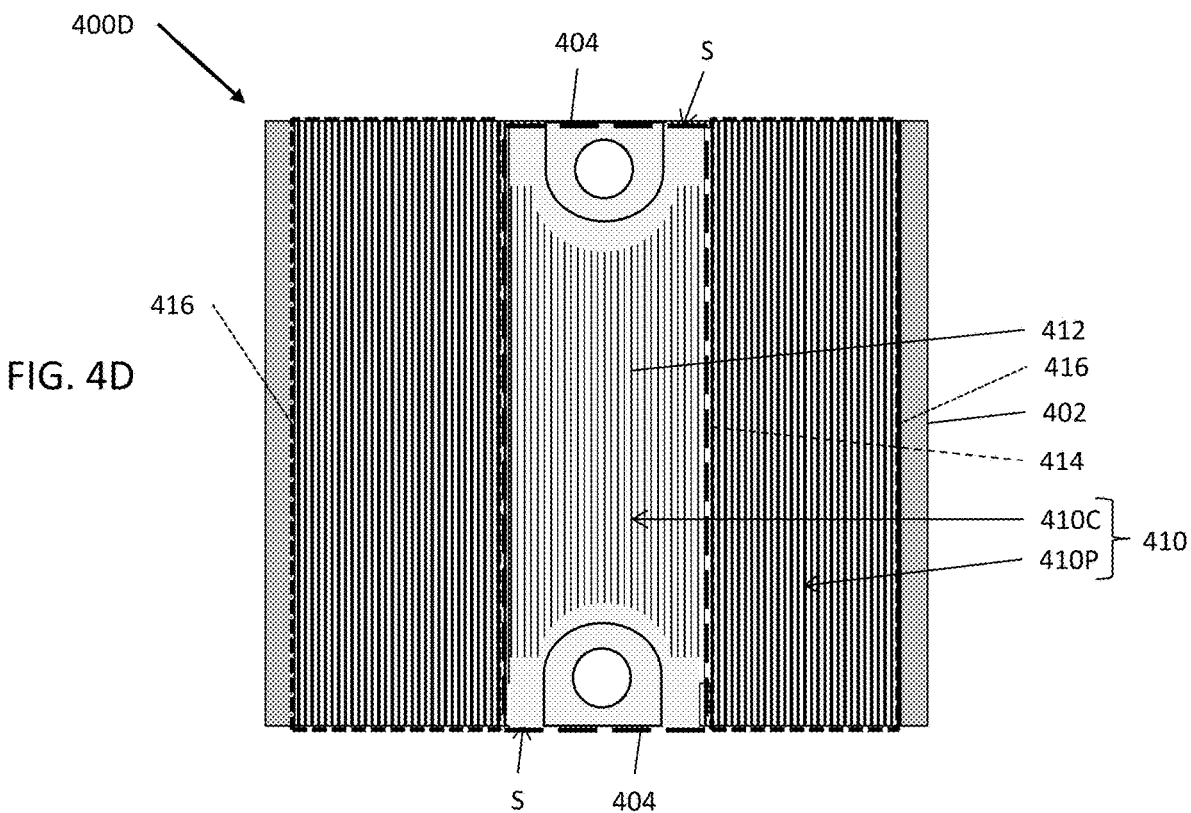

FIG. 4D is a top view of the air side of an interconnect 400D, according to various embodiments of the present disclosure. The interconnect 400D may be similar to the interconnect 400A. As such, only the differences therebetween will be discussed in detail.

Referring to FIG. 4D, at least some of the central air channels 410C may be shorter than the peripheral air channels 410P. Furthermore, the central air channels 410 in the middle of the central air field 414 maybe shorter than the central air channels 410 at the peripheral parts of the central air field 414. Furthermore, the central air channels 410 in the middle of the central air field 414 may have an increasing length (in the direction between the ring seal regions 404) as a function of distance from the middle of the interconnect 400D. For example, the edges of the central air channels 410 in the middle of the central air field 414 may form a semi-circular shape around the ring seal regions 404. In contrast, the central air channels 410 at the peripheral parts of the central air field 414 may have the same length and their edges facing the interconnect 400D edges 301 and 303 form a straight line.

In particular, air spaces S may be formed around the ring seal regions 404 due the shortening of air ribs 412 in the central air field 414. The air spaces S are located between the air ribs 412 in the peripheral air fields 416 and the ring seal regions 404. The air spaces S may be configured to increase air mass flow through the central air channels 410C, by providing additional space for air to flow around the ring seal regions 404. The spaces S may also reduce an air mass flow variation among the central air channels 410C. For example, air mass flow through variation between the central air channels 410C may be less than 25%, such as 20 to 25%. Furthermore, the air flow through the central air channels 410C may be at least 25% greater, such as 30 to 35% greater than through the peripheral flow channels 410P.

In some embodiments, the cross-sectional areas of the central air channels 410C may be larger than the cross-sectional areas of the peripheral air flow channel 410P, in order to further increase air flow through the central air flow channels 410C. However, in other embodiments, all the air flow channels 410 may have substantially the same cross-sectional area.

Referring to FIGS. 3A-3D and 4A-4D, various embodiments may include interconnects having any combination of the described air and fuel side features. For example, the interconnects 300A-300D may include any of the air side features shown in FIGS. 4A-4D, and the interconnects 400A-400D may include any of the fuel side features shown in FIGS. 3A-3D. However, in some embodiments, the interconnect having plural fuel holes 306 may have the fuel side features of interconnect 300D and the air side features of interconnect 400C.

According to various embodiments, the thickness of an interconnect may be increased, as compared to the comparative interconnect 10 shown in FIGS. 2A and 2B, in order to increase lateral heat conduction. In other embodiments, the aspect ratio of an interconnect may be modified, in order to increase a perimeter to active area ratio and decrease a thermal conduction distance from the center to edges of the interconnect.

In some embodiments, the thermal conductivity of an interconnect may be increased. For example, the density may be increased by modifying a starting chromium powder (e.g., direct-reduced chromium, different particle size, etc.). In some embodiments, the Fe-content is of an interconnect material powder may be increased, such as from 5% to from about 7 to about 10 wt. % Fe. Thus, the interconnect comprises an alloy of 7 wt. % Fe to 10 wt. % Fe and balance Cr (e.g. 7 wt. % to 10 wt. % iron and 90 wt. % to 93 wt. % chromium). The increased iron content may allow for the formation of a denser interconnect via powder metallurgy, which may improve thermal conduction and increase temperature uniformity.

In various embodiments the aspect ratio of an interconnect may be increased, such that the interconnect is more rectangular rather than a square, in order to increase the ratio of perimeter to active area and decrease the thermal conduction distance from the center to the edges of the interconnect. This configuration may be beneficial to the co-flow interconnects of FIGS. 3A-3D and 4A-4D, where fuel and air flow in parallel directions. In addition, this configuration may be even more beneficial to crossflow interconnects, where fuel and air flows are perpendicular to one another across the interconnect.

Figure 5A:
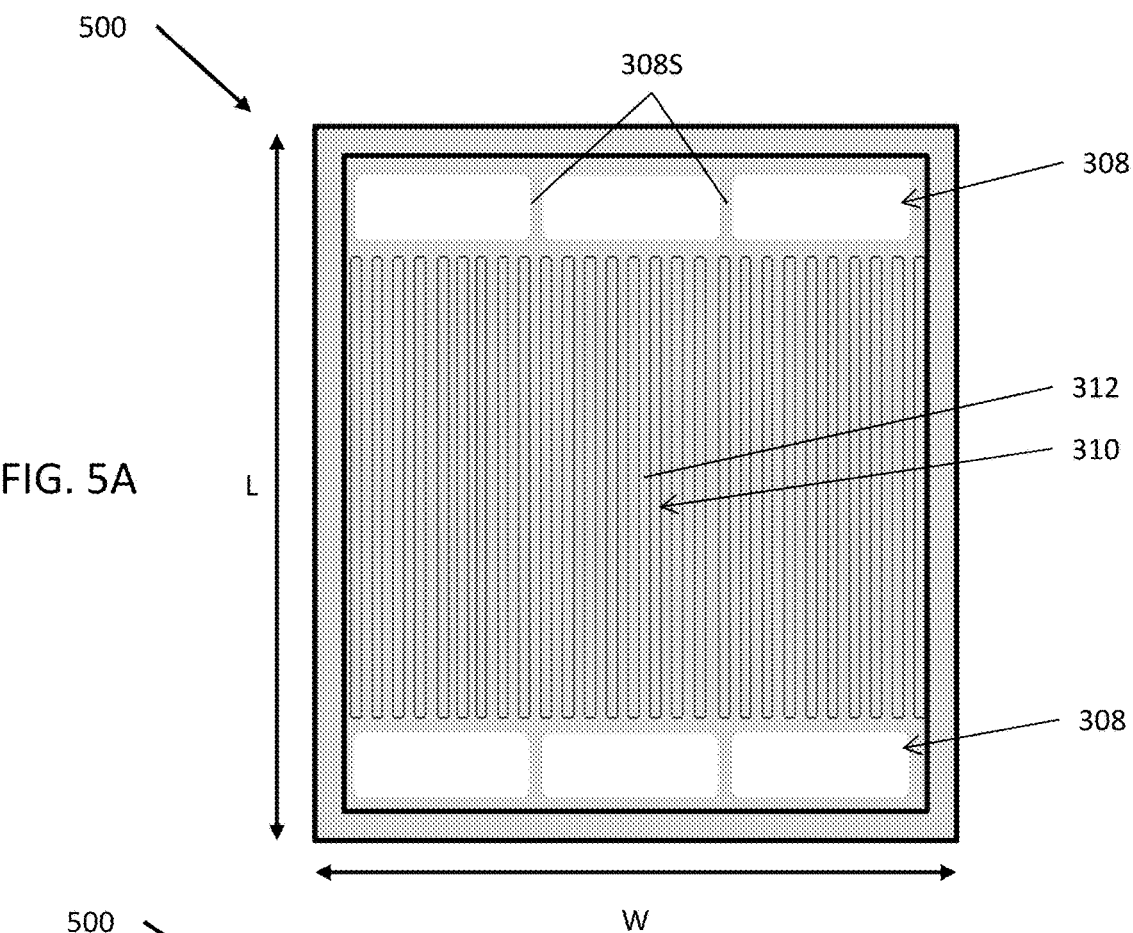
FIG. 5A is a top view of a fuel side of a crossflow interconnect, according to various embodiments of the present disclosure.
Figure 5B:
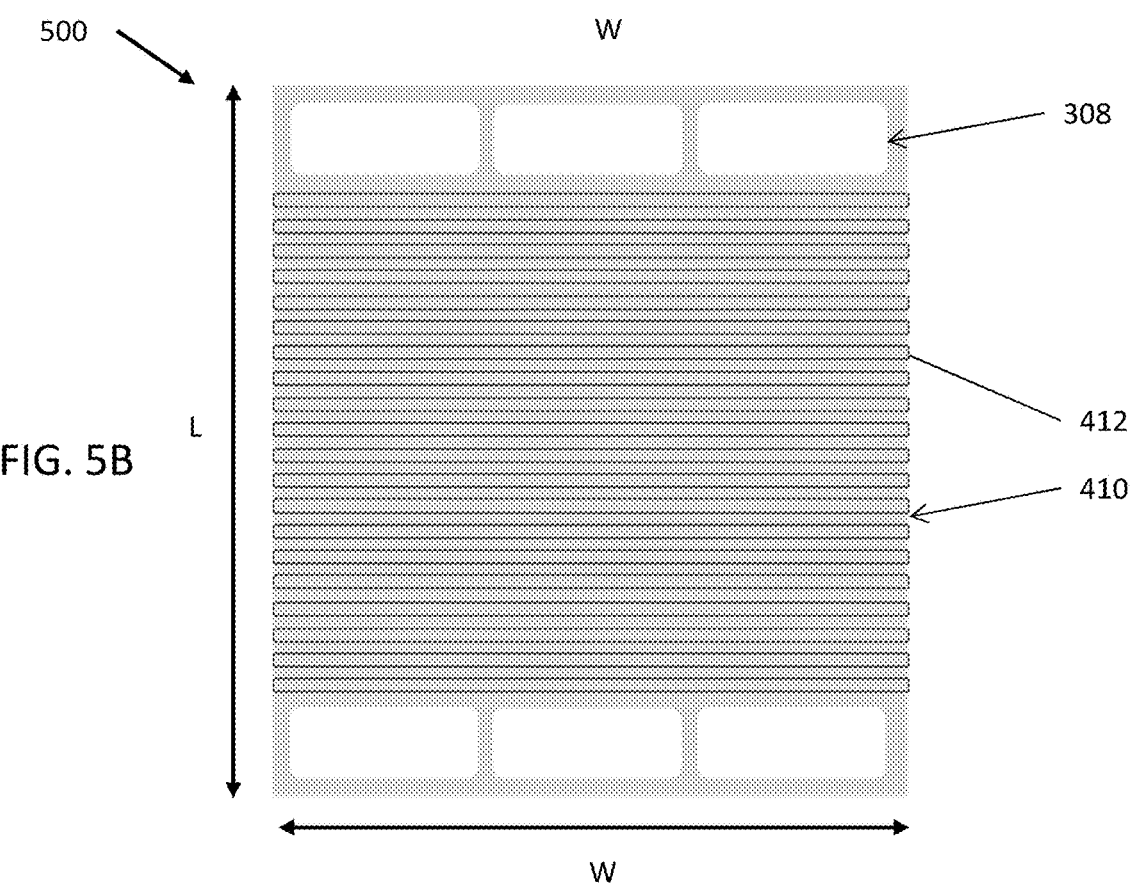
FIG. 5B is a top view of the air side of the interconnect of FIG. 5A.

FIG. 5A is a top view of a fuel side of a crossflow interconnect 500, according to various embodiments of the present disclosure. FIG. 5B is a top view of the air side of the interconnect 500 of FIG. 5A. The interconnect 500 may be similar to the previously described interconnects. As such, only the differences therebetween will be described in detail.

Referring to FIGS. 5A and 5B, the interconnect 500 may include enlarged fuel holes 308 that operate as fuel manifolds 304 (shown in FIG. 3A). The fuel holes 308 may optionally include supports (e.g., separators) 308S configured to increase the structural integrity of the interconnect 500 and/or fuel holes 308. The interconnect 500 may include fuel ribs 312 that at least partially define fuel channels that extend in a length direction L, which may be co-linear with a fuel flow direction, and air ribs 412 that at least partially define air channels 410 than extend in a width direction W, which may be colinear with an air flow direction and may be substantially perpendicular to the length direction L.

The interconnect 500 may have a length, taken the length direction L, of greater than 100 mm, such as 110 mm to 150 mm, and a fuel channel 310 length of at least 100 mm, such as 100 mm to 115 mm. The interconnect 500 may have a width, taken in the width W direction, of less than 100 mm, such as from 70 mm to 90 mm. Thus, the interconnect 500 may have a length to width ratio of greater than 1, such as from 1.05 to 2.75. or from 1.25 to 2.5.

Thus, in some embodiments, interconnects that include fuel channels having larger cross-sectional areas in a central fuel field than in peripheral fuel fields, by increasing the width, depth, or both the width and depth of the fuel channels in the central fuel field.

In various embodiments, interconnects provide improved thermal uniformity when operating on hydrogen fuel, which leads to higher fuel utilization and system efficiency. In some embodiments, a higher active area decreases current density and improves fuel cell performance.

Fuel cell systems of the embodiments of the present disclosure are designed to reduce greenhouse gas emissions and have a positive impact on the climate.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell interconnect, comprising:
 fuel ribs disposed on a first side of the interconnect and a least partially defining fuel channels;

air ribs disposed on an opposing second side of the interconnect and at least partially defining air channels,
fuel holes that extend through the interconnect; and
seal regions disposed on the second side of the interconnect and surrounding the fuel holes,
wherein:
the fuel channels comprise central fuel channels disposed in a central fuel field and peripheral fuel channels disposed in peripheral fuel fields disposed on opposing sides of the central fuel field, the central fuel channels are located between the fuel ribs and have larger cross-sectional areas than the peripheral fuel channels, such that when hydrogen is provided to the fuel channels, a hydrogen mass flow rate through the central fuel channels is higher than a hydrogen mass flow rate though the peripheral fuel channels;
the air channels comprise central air channels disposed in a central air field and peripheral air channels disposed in peripheral air fields disposed on opposing sides of the central air field; and
some of the peripheral air channels extend from a first peripheral edge of the interconnect to an opposing second peripheral edge of the interconnect and have edge portions, located adjacent to the first and the second peripheral edges of the interconnect, that are bent at an angle of 30 to 60 degrees relative to opposing third and fourth edges of the interconnect and to the central air channels.

2. The interconnect of claim 1, wherein:
widths of the central fuel channels are larger than widths of the peripheral fuel channels; and
the cross-sectional areas of the central fuel channels are from 5% to 40% greater than the cross-sectional areas of the peripheral fuel channels.

3. The interconnect of claim 1, wherein the central fuel channels have shorter lengths than the peripheral fuel channels.

4. The interconnect of claim 1, further comprising:
fuel manifolds formed in the first side of the interconnect and fluidly connected to the fuel channels; and
a fuel hole disposed in each of the fuel manifolds and extending through the interconnect.

5. The interconnect of claim 4, wherein at least some of the peripheral fuel channels and the corresponding fuel ribs extend into the fuel manifolds, such that peripheral fuel channels disposed closer to the central fuel field are shorter than peripheral fuel channels disposed further from the central fuel field.

6. The interconnect of claim 4, wherein each of the fuel manifolds has a maximum depth adjacent to the fuel hole and a minimum depth adjacent to opposing edges of the interconnect.

7. The interconnect of claim 4, further comprising fuel bumpers disposed in the fuel manifolds and configured to reduce fuel mass flow through the peripheral fuel channels, wherein the fuel bumpers and the fuel channels extend lengthwise in perpendicular directions.

8. The interconnect of claim 1, further comprising fuel blockers disposed between the fuel ribs in the peripheral fuel fields, the fuel blockers configured to reduce fuel mass flow through the peripheral fuel channels,
wherein the fuel blockers and the peripheral fuel channels extend lengthwise in perpendicular directions.

9. The interconnect of claim 1, wherein the interconnect comprises a chromium iron alloy comprising from 7 wt. % to 10 wt. % iron and 90 wt. % to 93 wt. % chromium.

10. The interconnect of claim 1, wherein the central air channels have larger cross-sectional areas than the peripheral air channels.

11. The interconnect of claim 10, wherein the cross-sectional areas of the central air channels are from 5% to 40% greater than the cross-sectional areas of the peripheral air channels.

12. The interconnect of claim 1, wherein the central air channels have shorter lengths than the peripheral air channels.

13. The interconnect of claim 12, wherein end portions of the air ribs which define the bent peripheral air channels partially block air flow to outermost ones of the peripheral air channels.

14. The interconnect of claim 13, wherein the bent air channels are longer than at least some of the central air channels.

15. The interconnect of claim 1, wherein:
at least one of the central air channels has at least one of a larger cross-sectional area or a shorter length than at least one of the respective peripheral air channels to increase air flow through the central air channels.

16. A fuel cell stack comprising solid oxide fuel cells separated by interconnects of claim 1.

17. A fuel cell system containing a fuel cell stack of claim 16, wherein air is provided into the air channels and more of the air flows through the central air channels than through the peripheral air channels.

18. The interconnect of claim 1, wherein:
the fuel ribs comprise central fuel ribs which define the central fuel channels, and peripheral fuel ribs which define the peripheral fuel channels;
each of the central fuel channels is located entirely between a respective two of the central fuel ribs; and
each of the central fuel ribs is elongated lengthwise along a same lengthwise direction as the central fuel channels.

19. The interconnect of claim 1, wherein fuel blockers are disposed in the peripheral fuel fields but not in the central fuel field.

20. The interconnect of claim 1, wherein the first and the second peripheral edges of the interconnect that are bent form air spaces disposed on at least one side of each of the seal regions, and the air spaces are configured to increase air mass flows around the seal regions and through the central air channels.

21. The interconnect of claim 1, wherein the first and the second peripheral edges of the interconnect that are bent form air spaces disposed on opposing sides of each of the seal regions, and the air spaces are configured to increase air mass flows around the seal regions and through the central air channels.

* * * * *